Figure 15:
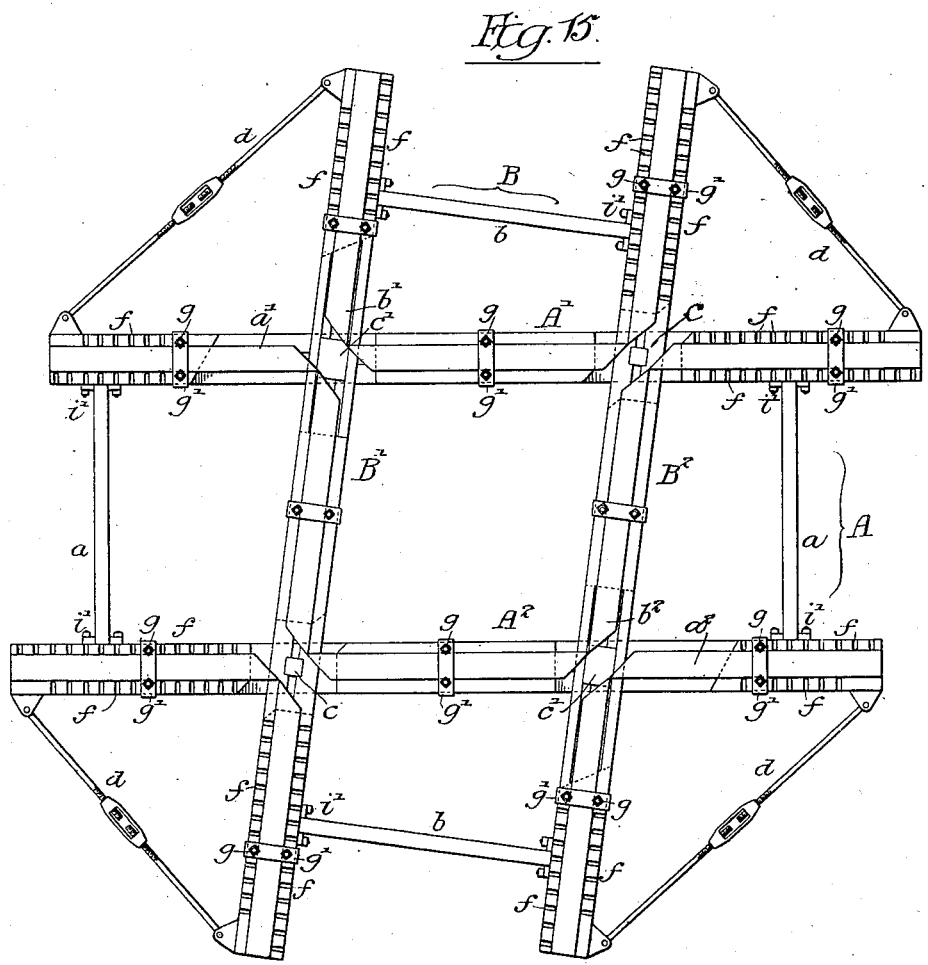

No. 678,214. Patented July 9, 1901.
V. ANGERER & A. R. CLINE.
CASTING CLAMP FOR TRACK STRUCTURES.
(Application filed Feb. 9, 1900.)
(No Model.) 3 Sheets—Sheet 1.
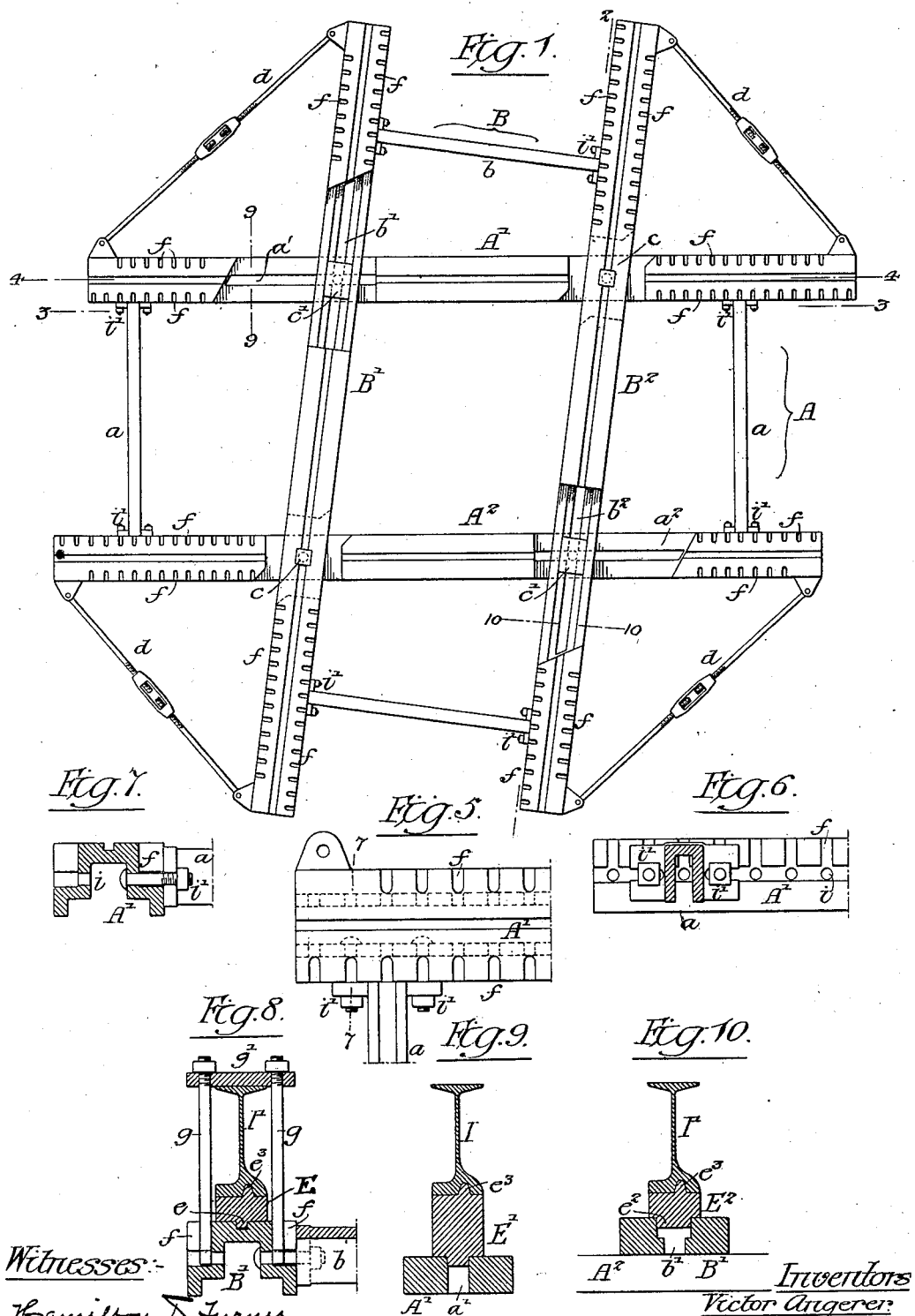

No. 678,214. Patented July 9, 1901.
V. ANGERER & A. R. CLINE.
CASTING CLAMP FOR TRACK STRUCTURES.
(Application filed Feb. 9, 1900.)
(No Model.) 3 Sheets—Sheet 2.
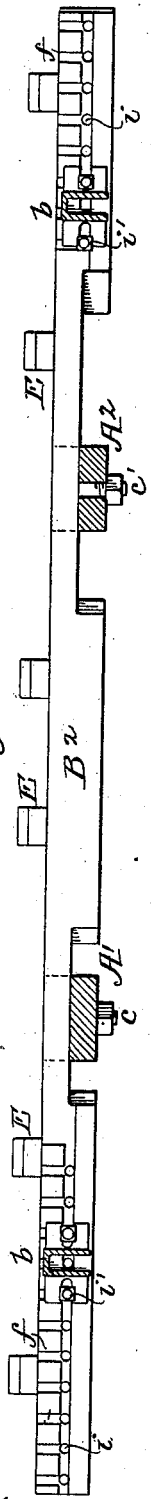
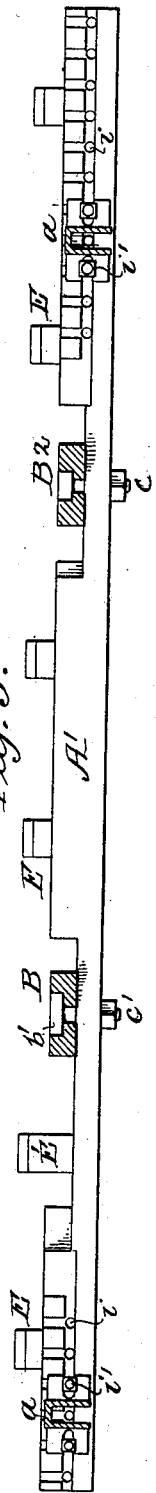
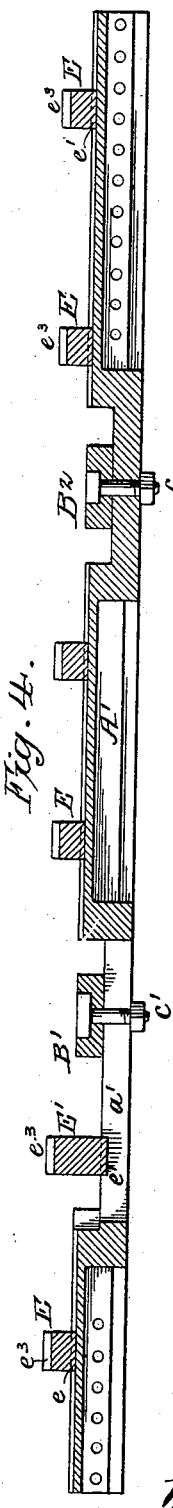
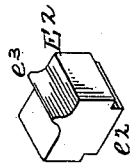
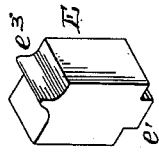
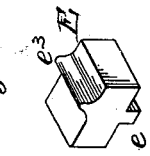
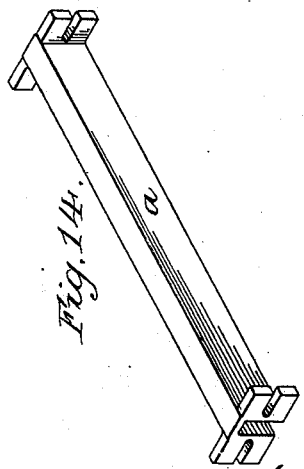

No. 678,214. Patented July 9, 1901.
V. ANGERER & A. R. CLINE.
CASTING CLAMP FOR TRACK STRUCTURES.
(Application filed Feb. 9, 1900.)

(No Model.) 3 Sheets—Sheet 3.

Witnesses:

Inventors:
Victor Angerer
Albert R. Cline
by their Attorneys:
Howson & Howson

United States Patent Office.

VICTOR ANGERER AND ALBERT R. CLINE, OF PHILADELPHIA, PENNSYLVANIA, ASSIGNORS TO WILLIAM WHARTON, JR., & COMPANY, INCORPORATED, OF SAME PLACE.

CASTING-CLAMP FOR TRACK STRUCTURES.

SPECIFICATION forming part of Letters Patent No. 678,214, dated July 9, 1901.

Application filed February 9, 1900. Serial No. 4,632. (No model.)

*To all whom it may concern:*

Be it known that we, VICTOR ANGERER and ALBERT R. CLINE, citizens of the United States, and residents of Philadelphia, Pennsylvania, have invented certain Improvements in Casting-Clamps for Track Structures, of which the following is a specification.

The object of our invention is to provide means for accurately supporting and holding in place the rail-sections that make up a railroad-crossing or other rail structure during its manufacture and to arrange the support so that it can be adjusted for different angles of crossings and different gages of track.

In the accompanying drawings, Figure 1 is a plan view of our new support. Fig. 2 is a section on the line 2 2, Fig. 1. Fig. 3 is a sectional view on the line 3 3, Fig. 1. Fig. 4 is a sectional view on the line 4 4, Fig. 1. Fig. 5 is a plan view of part of Fig. 1. Fig. 6 is a side view of Fig. 5. Fig. 7 is a section on the line 7 7, Fig. 5. Fig. 8 is a view similar to Fig. 7, showing a rail-section clamped in position. Fig. 9 is a section on the line 9 9, Fig. 1, with the rail-section in position. Fig. 10 is a section on the line 10 10, Fig. 1, with the rail-section in position. Figs. 11, 12, and 13 are perspective views of the blocks. Fig. 14 is a perspective view of one of the braces. Fig. 15 is a plan view similar to Fig. 1, showing the rails in position.

In making crossing or like switch structures in which the rail-sections are secured together by molten metal being poured around the sections at the joints it is necessary to place the said sections in a suitable mold. Heretofore it has been a difficult matter to properly adjust the rail-sections in alinement and hold them rigidly in the proper position during the casting operation.

Our invention relates particularly to the support on which the sections are mounted, so that they can be adjusted at the proper angles and held in the adjusted position.

A is a structure having two parallel members $A'$ $A^2$, connected together by tie-braces $a$ $a$, and mounted on this structure is a crossing structure B, having longitudinal members $B'$ $B^2$, connected together by tie-braces $b$ $b$. The structure B is mounted upon the structure A and is adjustably connected thereto by bolts $c$ $c'$. In the member $A'$ is a slot $a'$, and in the member $A^2$ is a slot $a^2$, and in the member $B'$, where it crosses the member $A'$, is a slot $b'$, and in the member $B^2$, where it crosses the member $A^2$, is a slot $b^2$. Tie-rods $d$ $d$ connect the ends of the members of the structures A and B together, so that when the structure B is mounted in proper position on the structure A and bolted thereto the tie-rods $d$ are adjusted so as to make a rigid support for the rail-sections. Mounted on the upper face of the members $A'$, $A^2$, $B'$, and $B^2$ of the structures are blocks on which the rail-sections are supported. The blocks E are mounted on the main portions of the members, which are grooved to receive the tongues $e$ on the blocks. Blocks $E'$, Figs. 9 and 12, are mounted on the depressed portions of the members $A'$ and $A^2$, while the blocks $E^2$ are mounted on the portions of the members $B'$ $B^2$ having the slots $b'$ $b^2$ therein. The blocks $E'$ have tongues $e'$, adapted to the slots $a'$ and $a^2$, and the blocks $E^2$ have tongues $e^2$, adapted to the slots $b'$ and $b^2$, as shown in Figs. 9 and 10. On the upper surface of each block is a projection $e^3$, shaped to fit the groove in the rail-sections.

On each side of each member $A'$, $A^2$, $B'$, and $B^2$ is a series of sockets $f$ for the reception of T-headed bolts $g$ $g$, which are connected together by clamp-plates $g'$, extending across the rails, as shown in Fig. 8. When the nuts of these bolts are screwed down, the rail-sections are clamped securely to the supporting structure. Any number of these clamp-plates can be used to secure the rail-sections to the structure. In the sides of each member, near each end, is a series of bolt-holes $i$ for the securing-bolts $i'$, which confine the tie-braces $a$ and $b$ to their respective members. These tie-braces, as shown in Fig. 14, have slotted flanges at each end, so as to accommodate the securing-bolts $i'$.

When it is desired to make a crossing structure out of rail-sections secured together by molten metal poured around the sections at the joints, the members of their respective structures A and B are assembled and secured rigidly together by the bolts, tie-braces, and tie-rods. The beams or girders B' B² of the structure B are placed upon the beams or girders A' A² of the structure A. The member B² is pivoted to the member A' by a bolt c, and the member B' is pivoted to the member A² by a bolt c. The members are adjusted to the angle desired and to the proper gage. The member B' is then secured to the member A' by the bolt c', and the member B² is secured to the member A² by the bolt c'. The tie-braces a a and b b are then secured in position, and the tie-rods are coupled to the members and tightened, so as to form a rigid structure. In some instances the beams may be secured together by their tie-braces when the gage is not to be altered, and one frame B may be mounted on the other frame A at the desired angle and the frames secured together by the bolts c c'. The blocks E E' E² are then placed upon the members of the structures A and B, so as to properly support the short rail-sections that go to make up the crossing. These sections are then mounted upon the blocks, the projections on the blocks, as in Fig. 15, entering the grooves of the rail-sections, and these rail-sections are clamped to the structure by the cross-bar g' and clamp-bolts g g. Any number of these clamps may be used as desired. The mold is then formed at the crossing-points of the several sections in the ordinary manner—such, for example, as that shown in Patent No. 490,941, granted to Angerer and Psilander January 31, 1893—and the molten metal is poured into the molds at the joints, and when the metal is set the clamps can be removed and the rail structure can be detached from the supporting structure.

We claim as our invention—

1. In apparatus of the character described, the combination of two pairs of beams or girders, one pair crossing the other and mounted thereon, means for connecting said beams together, and means for securing the rail-sections upon the beams, substantially as described.

2. In apparatus of the character described, the combination of two pairs of rail-supporting beams or girders, one pair crossing the other, and means for connecting said beams together so as to permit of angular adjustment of one pair in respect to the other, substantially as described.

3. In apparatus of the character described, the combination of two pairs of rail-supporting beams or girders, one pair crossing the other, and means for connecting said beams together, the beams of each pair being adjustable with respect to each other, substantially as described.

4. In apparatus of the character described, the combination of two pairs of beams or girders, one pair arranged at an angle to the other, means for connecting the beams together, and blocks on the beams or girders for supporting the rail-sections above and parallel with the upper surface of the beams or girders, substantially as described.

5. In apparatus of the character described, the combination of two pairs of beams or girders, one pair mounted upon the other, with means for connecting said beams together so as to permit of angular adjustment of one pair in respect to the other, and means for securing the rail-sections to the beams, substantially as described.

6. In apparatus of the character described, the combination of two pairs of beams or girders, one pair mounted upon, and extending at an angle to the other, means for supporting the rails upon the upper pair, and tie-braces securing the members of each section together, said tie-braces being detachable for the purpose set forth.

7. In apparatus of the character described, the combination of two pairs of beams or girders, one pair mounted upon, and extending at an angle to the other, a longitudinal groove in each beam or girder, blocks mounted thereon, said blocks having tongues entering the grooves and means for securing the rail-sections upon the blocks, substantially as described.

8. The combination of a support for rail-sections during the process of uniting said sections, by casting, said support having a longitudinal groove therein, blocks, tongues thereon entering the grooves, the said blocks having ribs on their upper faces entering the grooves in the rail-sections to be secured together, bolts shaped to engage the supports, and a cross-bar, said cross-bar and bolts holding the rail-sections in position during the process of casting, substantially as described.

9. In apparatus of the character described, the combination of two pairs of rail-supporting beams or girders, one pair mounted crosswise upon the other, with pivotal connections between the beams of the upper pair and the beams of the lower pair, said pivotal connections being located at points where the beams cross, substantially as described.

10. In apparatus of the character described, the combination of two pairs of rail-supporting beams or girders, one pair mounted crosswise upon the other, with pivotal connection between the beams of the upper pair and the beams of the lower pair, said pivotal connections being located at points where the beams cross, and locking connections between the beams at the other crossing points of the same, substantially as described.

11. In apparatus of the character described, the combination of two pairs of rail-supporting beams or girders, one pair mounted crosswise upon the other, said beams being recessed at the crossing points whereby the upper surfaces of both pairs of beams will be in the same horizontal plane, substantially as described.

12. In apparatus of the character described, the combination of two pairs of rail-supporting beams or girders, one pair mounted upon, and extending at an angle to the other, with tie-rods for connecting the projecting ends of the beams of one pair to the projecting ends of the beams of the other pair, so as to lock the beams together and form a rigid structure, substantially as described.

13. In apparatus of the character described, the combination of two pairs of rail-supporting beams or girders, one pair mounted upon, and extending at an angle to the other, with adjustable tie-rods for connecting the projecting ends of the beams of one pair to the projecting ends of the beams of the other pair, so as to lock the beams together and form a rigid structure, substantially as described.

14. In apparatus of the character described, the combination of two pairs of rail-supporting beams or girders, one pair mounted upon, and extending at an angle to the other, with tie-rods for connecting the projecting ends of the beams of one pair to the projecting ends of the beams of the other pair, so as to lock the beams together and form a rigid structure, and transverse braces for connecting together the beams of each pair, substantially as described.

15. The combination of a structure A having two members A', A², tie-braces $a$ securing the two members together, a structure B having two members B', B², and a tie-brace $b$, said structure B crossing the structure A, bolts securing the two structures together at diametrically opposite corners, the structures being slotted at the other corners, and bolts fitted to the slots, substantially as and for the purpose set forth.

16. In apparatus of the character described, the combination of two pairs of rail-supporting beams or girders, one pair mounted upon the other, with pivotal connections between the beams of the upper pair and the beams of the lower pair, a series of notches in the sides of each beam of each pair, bolts shaped to engage the notches, and cross-bars to which the bolts are fitted, said cross-bars and bolts holding the rail-sections in position during the process of casting, substantially as described.

17. In apparatus of the character described, the combination of a beam to which one or more rail-sections can be secured, said beam having a slot and a series of sockets communicating with one side of the slot, headed bolts shaped to fit the sockets, while the heads of the bolts rest in the slot, and clamp-plates with which the bolts engage and by which the rail-sections are secured to the beam, substantially as described.

18. In apparatus of the character described, the combination of two beams, a tie-brace extending from one beam to the other, said tie-brace being flanged, a series of holes in the side of each beam, and bolts mounted in the holes and arranged to secure the tie-braces in their different positions of adjustment, substantially as described.

19. In apparatus of the character described, the combination of two beams, tie-braces extending from one beam to the other, a series of clamp-plates for clamping the rail-sections to each beam, each beam having a groove in each side, a series of holes in the beams, and a series of sockets or slots, headed securing-bolts mounted in the sockets and engaging the clamp-plates, the heads of said bolts resting in the groove, and bolts extending through the holes in the beams and attaching the tie-braces to the beams, substantially as described.

In testimony whereof we have signed our names to this specification in the presence of two subscribing witnesses.

VICTOR ANGERER.
ALBERT R. CLINE.

Witnesses:
LEWIS R. ASHHURST, Jr.,
C. W. CROASDILL.